(12) United States Patent
Vega et al.

(10) Patent No.: US 7,689,747 B2
(45) Date of Patent: Mar. 30, 2010

(54) SYSTEMS AND METHODS FOR AN AUGMENTED INTERRUPT CONTROLLER AND SYNTHETIC INTERRUPT SOURCES

(75) Inventors: Rene Antonio Vega, Kirkland, WA (US); Nathan T. Lewis, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 10 days.

(21) Appl. No.: 11/092,012

(22) Filed: Mar. 28, 2005

(65) Prior Publication Data
US 2006/0218328 A1    Sep. 28, 2006

(51) Int. Cl.
*G06F 13/24* (2006.01)

(52) U.S. Cl. .......... 710/261; 710/48

(58) Field of Classification Search ......... 710/260–264, 710/48
See application file for complete search history.

(56) References Cited

U.S. PATENT DOCUMENTS

| | | | | |
|---|---|---|---|---|
| 5,418,968 | A * | 5/1995 | Gobeli ................ | 710/260 |
| 6,240,483 | B1 * | 5/2001 | Gutta et al. .......... | 710/260 |
| 6,295,573 | B1 * | 9/2001 | Bailey et al. ........ | 710/260 |
| 7,139,857 | B2 * | 11/2006 | Wahler ................ | 710/269 |
| 7,222,203 | B2 * | 5/2007 | Madukkarumukumana et al. .................. | 710/260 |
| 2004/0215860 | A1 * | 10/2004 | Armstrong et al. ...... | 710/260 |
| 2006/0020731 | A1 * | 1/2006 | Sasage ................ | 710/264 |
| 2006/0036791 | A1 * | 2/2006 | Jeyasingh et al. ...... | 710/260 |

* cited by examiner

*Primary Examiner*—Clifford H Knoll
(74) *Attorney, Agent, or Firm*—Woodcock Washburn LLP (57) ABSTRACT

Various embodiments of the present invention are directed to augmented interrupt controllers (AICs) and to synthetic interrupt sources (SISs) providing richer interrupt information (or "synthetic interrupts" or "SIs"). The AIC and SIS provide efficient means for sending and receiving interrupts, and particularly interrupts sent to and received by virtual machines. Several of these embodiments are specifically directed to an interrupt controller that is extended to accept and deliver additional information associated with an incoming interrupt. For certain such embodiments, a memory-mapped extension to the interrupt controller includes a data structure that is populated with the additional information as part of the interrupt delivery. Although several of the embodiments described herein are disclosed in the context of a virtual machine system, the inventions disclosed herein can also be applied to traditional computer systems (without a virtualization layer) as well.

24 Claims, 8 Drawing Sheets

SYSTEMS AND METHODS FOR AN AUGMENTED INTERRUPT CONTROLLER AND SYNTHETIC INTERRUPT SOURCES

FIELD OF THE INVENTION

The present invention generally relates to the field of interrupt controllers and, particularly, to interrupt controllers for use in virtual machines (also known as "processor virtualizations"). More specifically, the present invention is directed to an augmented interrupt controller for use in a virtual machine environment, as well as to synthetic interrupt sources comprising richer interrupt information for use by said augmented interrupt controller.

BACKGROUND OF THE INVENTION

Computers include general purpose central processing units (CPUs) that are designed to execute a specific set of system instructions. A group of processors that have similar architecture or design specifications may be considered to be members of the same processor family. Examples of current processor families include the Motorola 680X0 processor family, manufactured by Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format. The Motorola PowerPC instruction set is based on the Reduced Instruction Set Computer (RISC) format. CISC processors use a large number of instructions, some of which can perform rather complicated functions, but which require generally many clock cycles to execute. RISC processors use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Processor Virtualization

Computer manufacturers want to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include an emulator program that allows the host computer to emulate the instructions of an unrelated type of CPU, called a guest. Thus, the host computer will execute an application that will cause one or more host instructions to be called in response to a given guest instruction. Thus the host computer can both run software design for its own hardware architecture and software written for computers having an unrelated hardware architecture. As a more specific example, a computer system manufactured by Apple Computer, for example, may run operating systems and program written for PC-based computer systems. It may also be possible to use an emulator program to operate concurrently on a single CPU multiple incompatible operating systems. In this arrangement, although each operating system is incompatible with the other, an emulator program can host one of the two operating systems, allowing the otherwise incompatible operating systems to run concurrently on the same computer system.

When a guest computer system is emulated on a host computer system, the guest computer system is said to be a "virtual machine" as the guest computer system only exists in the host computer system as a pure software representation of the operation of one specific hardware architecture. The terms emulator, virtual machine, and processor emulation are sometimes used interchangeably to denote the ability to mimic or emulate the hardware architecture of an entire computer system. As an example, the Virtual PC software created by Connectix Corporation of San Mateo, Calif. emulates an entire computer that includes an Intel 80X86 Pentium processor and various motherboard components and cards. The operation of these components is emulated in the virtual machine that is being run on the host machine. An emulator program executing on the operating system software and hardware architecture of the host computer, such as a computer system having a PowerPC processor, mimics the operation of the entire guest computer system.

The emulator program acts as the interchange between the hardware architecture of the host machine and the instructions transmitted by the software running within the emulated environment. This emulated environment might be created by a virtual machine monitor (VMM) which is a software layer that runs directly above the hardware and which virtualizes all the resources of the machine by exposing interfaces that are the same as the hardware the VMM is virtualizing (which enables the VMM to go unnoticed by operating system layers running above it). In this configuration a host operating system (HOS) and a VMM may run side-by-side on the same physical hardware. Alternately, the emulator program may be the HOS itself running directly on the physical computer hardware and emulating another hardware configuration. In a specific implementation of this embodiment, the HOS software may specifically comprise one embodiment of a "hypervisor."

A hypervisor is a control program that exists near the kernel level of a HOS and operates to allow one or more secondary operating systems, other than the HOS, to use the hardware of the computer system, including the physical processor(s) of the computer system. A hypervisor emulates the operating environment for the secondary operating system so that the secondary operating system believes that it is operating in its customary hardware and/or operating system environment and that it is in logical control of the computer system, even though it may in fact be operating in another hardware and/or operating system environment and that the HOS may be in logical control of the computer system. This is significant because many operating systems function such that the operating system must operate as though it is in exclusive logical control of the hardware of the computer system. Thus, for multiple operating systems to function simultaneously on a single computer system, the hypervisor of each operating system must function to mask the presence of the other operating systems such that each operating system functions as though it has exclusive control over the entire computer system.

For simplicity, processor virtualization programs, including but not limited to VMMs and hypervisors, are collectively referred to herein as "virtualizers." Moreover, any aspect of the inventions disclosed herein in the context of a hypervisor are also presumed to be equally valid and disclosed for a VMM (or other virtualizers) and vice versa.

Interrupt Controllers

As known and appreciated by those of skill in the art, in typical computer systems (e.g., physical hardware executing a single operating system) the hardware devices (network cards, printers, other peripheral devices, etc.) communicate with the processor core software running on each processor core through interrupts. However, while there are several kinds of interaction between each processor core and the other hardware in the system, all such interactions initiated from outside the core are funneled through a single, simple interrupt delivery mechanism. Moreover, in traditional systems the number of interrupt vectors is very limited, which makes it necessary to group events together under a single common interrupt for each group. Thus when the processor core software receives an interrupt, it must take several steps to identify the cause and context of the interrupt since existing interrupt delivery mechanisms generally have no provisions for reliably identifying the source or cause of an interrupt. In addition, a single interrupt may also be indicative of only one of several similar events from a single physical or virtual device. For example, a messaging system implemented at a higher layer of abstraction may need hundreds or thousands of individually addressable signals in order to be performant, and the core processor software must determine which addressable signal corresponds with an interrupt received from these types of devices.

When the system is running under a hypervisor, VMM, or other machine virtualization technology (collectively "virtualizers"), the services presented by virtual devices to a partition (an instance of a virtual machine) will generally signal that partition via the same interrupt mechanism as hardware devices in a typical computer system. However, in a virtual machine environment, not only are devices for the virtual machine virtualized but so is the processor core(s) for each virtual machine. Consequently, the core processor software for each such virtualized processor core is further complicated by the fact that it must communicate with the virtualizer (e.g., the hypervisor or VMM) to actually handle interrupts where these interrupts may be generated by both hardware devices and virtualized devices (where the latter of which only exist as software). Because existing interrupt delivery mechanisms generally have no provisions for reliably identifying the source of an interrupt, especially ones generated by software, in a virtualized environment the processor resources required to identify the source and nature of an interrupt are substantially more costly. Moreover, data associated with an interrupt generally has to be widely accessible to hardware and system software, and trustworthy delivery is difficult under typical circumstances where a virtualizer is hosting multiple bodies of mutually distrustful system software. (Under such circumstances, there is a need to push information into partitions with interrupts, and any information associated with those interrupts needs to be protected from a malicious operating system in a neighboring partition, even when all partitions are participating in the same interrupt management scheme.)

Consequently, since interrupts may come from several different sources in each VM (including both hardware and software sources), many of which are "further away" than devices on a hardware bus (and thus require many more physical processor cycles to complete), what is needed in the art is a richer interrupt delivery mechanism that includes more information in order to enhance the performance and utility of a machine virtualization system.

SUMMARY OF THE INVENTION

Various embodiments of the present invention are directed to augmented interrupt controllers (AICs) and to synthetic interrupt sources (SISs) providing richer interrupt information (or "synthetic interrupts" or "SIs"). The AIC and SIS provide efficient means for sending and receiving interrupts, and particularly interrupts sent to and received by virtual machines. Several of these embodiments are specifically directed to an interrupt controller that is extended to accept and deliver additional information associated with an incoming interrupt. For certain such embodiments, a memory-mapped extension to the interrupt controller includes a data structure that is populated with the additional information as part of the interrupt delivery. Although several of the embodiments described herein are disclosed in the context of a virtual machine system, the inventions disclosed herein can also be applied to traditional computer systems (without a virtualization layer) as well.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
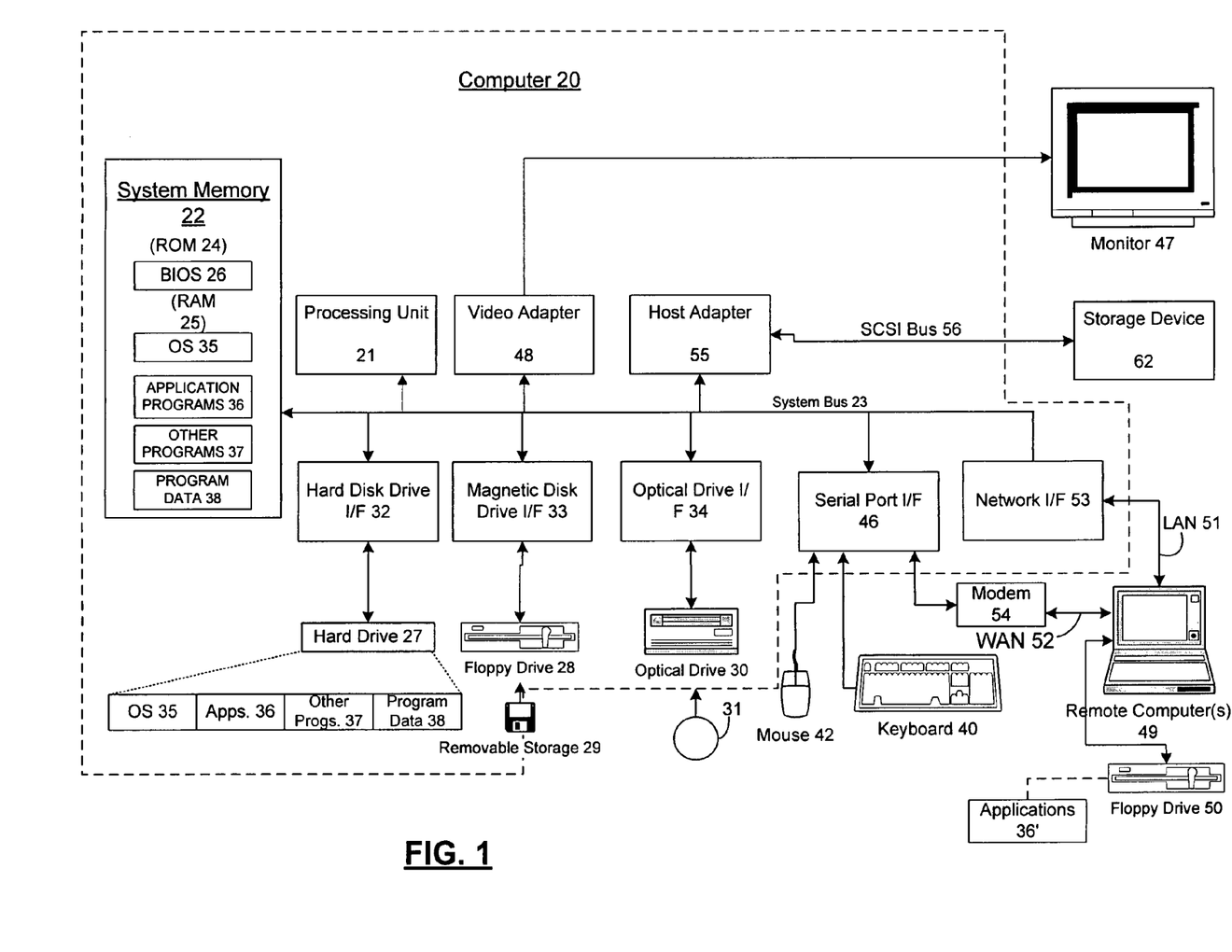
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMS) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Virtual Machines

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

Figure 2:
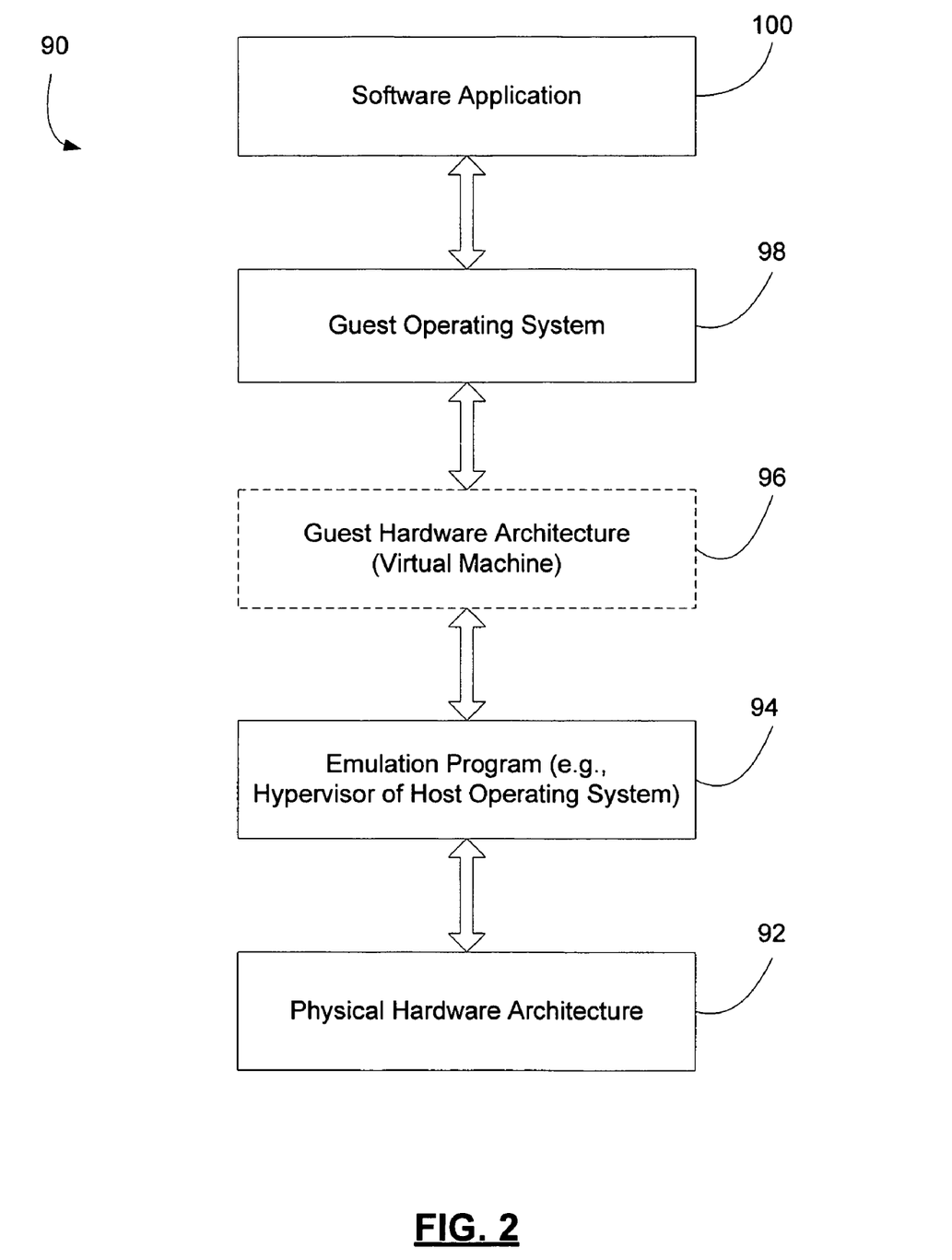
FIG. 2 illustrates the logical layering of the hardware and software architecture for an emulated operating environment in a computer system.

FIG. 2 is a diagram representing the logical layering of the hardware and software architecture for an emulated operating environment in a computer system. In the figure, an emulation program 94 runs directly or indirectly on the physical hardware architecture 92. Emulation program 94 may be (a) a virtual machine monitor that runs alongside a host operating system, (b) a specialized host operating system having native emulation capabilities, or (c) a host operating system with a hypervisor component wherein said hypervisor component performs said emulation. Emulation program 94 emulates a guest hardware architecture 96 (shown as a broken line to illustrate the fact that this component is the "virtual machine," that is, hardware that does not actually exist but is instead emulated by said emulation program 94). A guest operating system 98 executing on said guest hardware architecture 96, and software application 100 runs on the guest operating system 98. In the emulated operating environment of FIG. 2—and because of the operation of emulation program 94—software application 100 can run in computer system 90 even though software application 100 is designed to run on an operating system that is generally incompatible with the host operating system and hardware architecture 92.

Figure 3A:
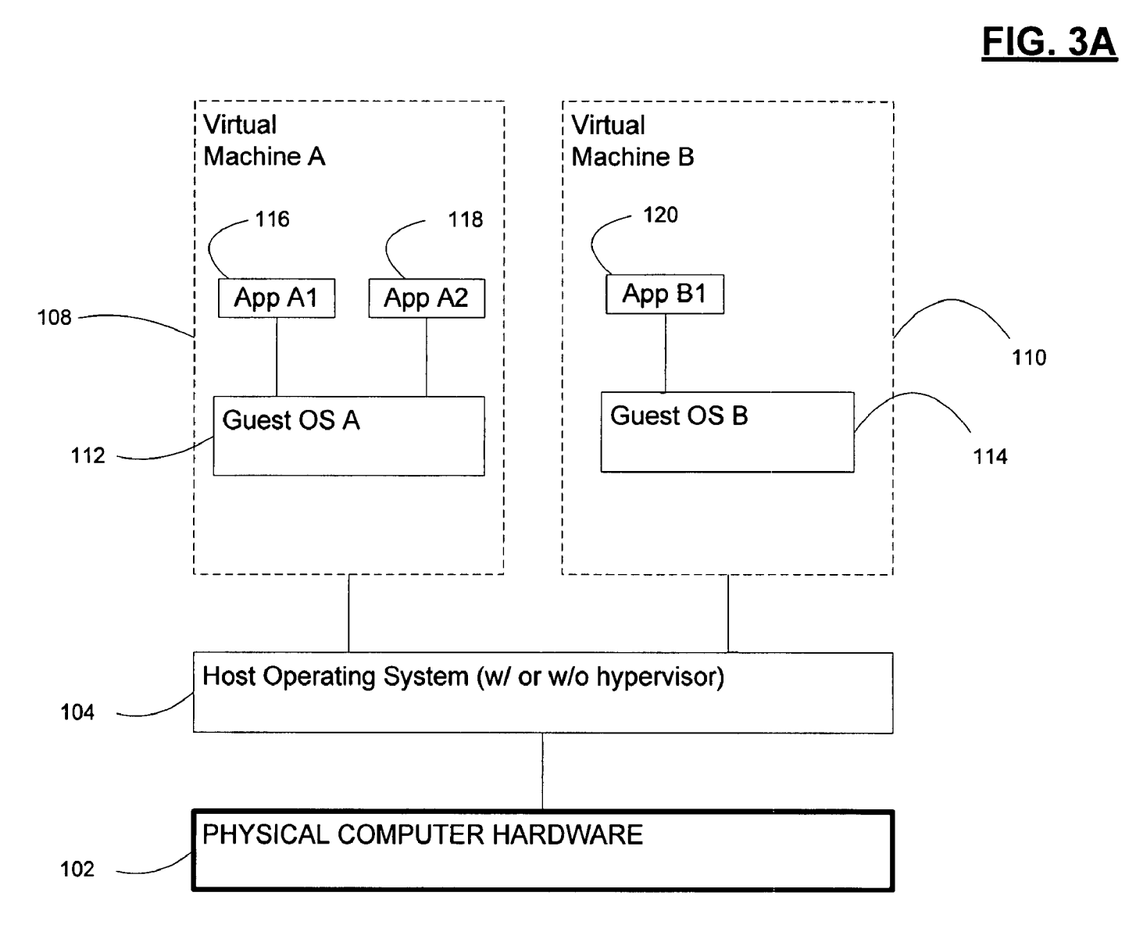
FIG. 3A illustrates a virtualized computing system wherein the emulation is performed by the host operating system (either directly or via a hypervisor)

FIG. 3A illustrates a virtualized computing system comprising a host operating system software layer 104 running directly above physical computer hardware 102 where the host operating system (host OS) 104 provides access to the resources of the physical computer hardware 102 by exposing interfaces that are the same as the hardware the host OS is emulating (or "virtualizing")—which, in turn, enables the host OS to go unnoticed by operating system layers running above it. To perform the emulation, the host operating system 104 may be a specially designed operating system with native emulations capabilities or, alternately, it may be a standard operating system with an incorporated hypervisor component for performing the emulation.

Referring again to FIG. 3A, above the host OS 104 are two virtual machine (VM) implementations, VM A 108, which may be, for example, a virtualized Intel 386 processor, and VM B 110, which may be, for example, a virtualized version of one of the Motorola 680X0 family of processors. In each VM 108 and 110 are guest operating systems (guest OSs) A112 and B114 respectively. Running on top of guest OS A112 are two applications, application A1116 and application A2118, and running on top of guest OS B 114 is application B1120.

In regard to FIG. 3A, it is important to note that VM A 108 and VM B 110 (which are shown in broken lines) are virtualized computer hardware representations that exist only as software constructions and which are made possible due to the presence of specialized software code that not only presents VM A 108 and VM B 110 to Guest OS A 112 and Guest OS B 114 respectively, but which also performs all of the software steps necessary for Guest OS A 112 and Guest OS B 114 to indirectly interact with the real physical computer hardware 102.

Figure 3B:
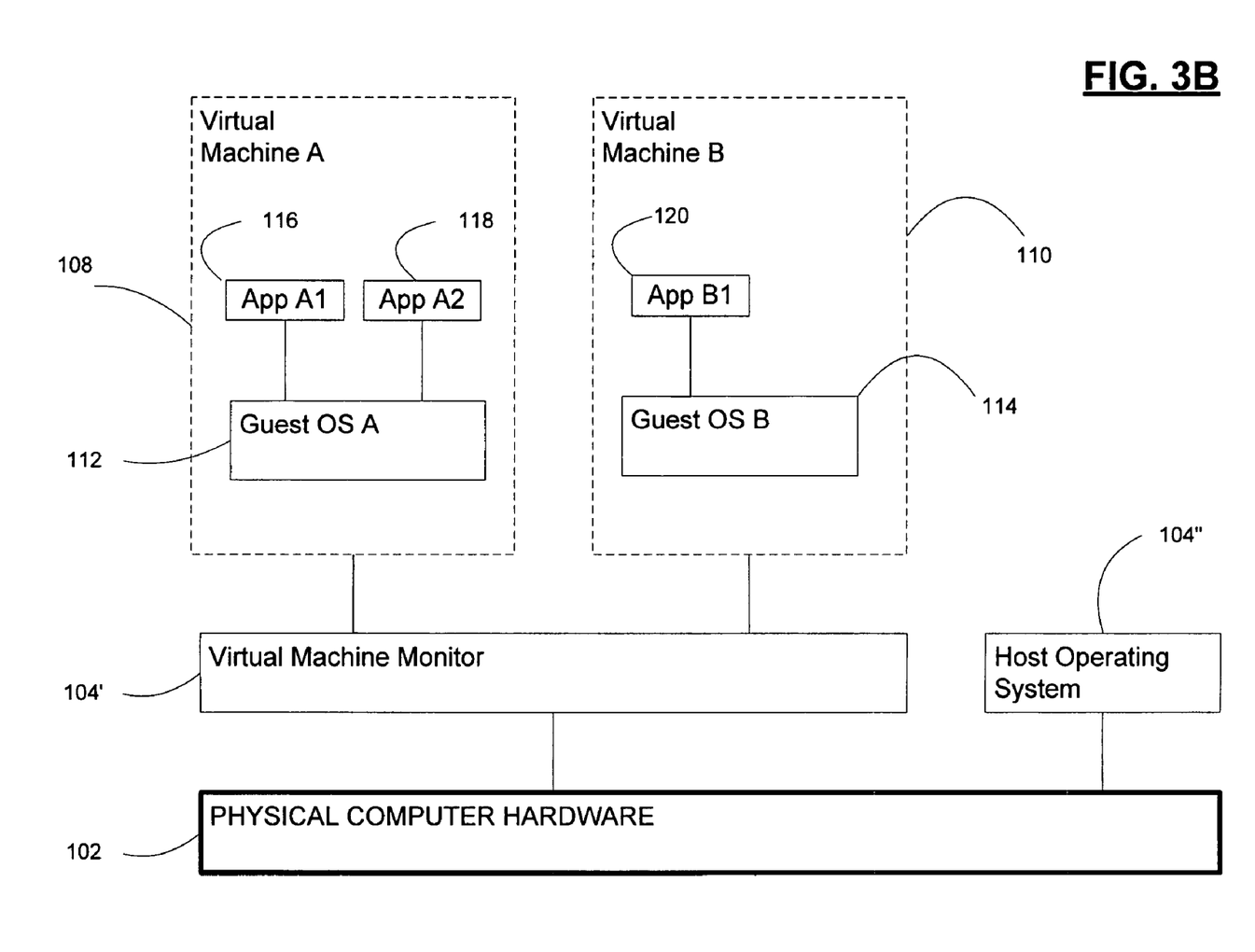
FIG. 3B illustrates an alternative virtualized computing system wherein the emulation is performed by a virtual machine monitor running side-by-side with a host operating system.

FIG. 3B illustrates an alternative virtualized computing system wherein the emulation is performed by a virtual machine monitor (VMM) 104' running alongside the host operating system 104". For certain embodiments the VMM may be an application running above the host operating system 104 and interacting with the computer hardware only through said host operating system 104. In other embodiments, and as shown in FIG. 3B, the VMM may instead comprise a partially independent software system that on some levels interacts indirectly with the computer hardware 102 via the host operating system 104 but on other levels the VMM interacts directly with the computer hardware 102 (similar to the way the host operating system interacts directly with the computer hardware). And in yet other embodiments, the VMM may comprise a fully independent software system that on all levels interacts directly with the computer hardware 102 (similar to the way the host operating system interacts directly with the computer hardware) without utilizing the host operating system 104 (although still interacting with said host operating system 104 insofar as coordinating use of said computer hardware 102 and avoiding conflicts and the like).

All of these variations for implementing the VMM are anticipated to form alternative embodiments of the present invention as described herein, and nothing herein should be interpreted as limiting the invention to any particular VMM configuration. In addition, any reference to interaction between applications 116, 118, and 120 via VM A 108 and/or VM B 110 respectively (presumably in a hardware emulation scenario) should be interpreted to be in fact an interaction between the applications 116, 118, and 120 and a VMM. Likewise, any reference to interaction between applications VM A 108 and/or VM B 110 with the host operating system 104 and/or the computer hardware 102 (presumably to execute computer instructions directly or indirectly on the computer hardware 102) should be interpreted to be in fact an interaction between the VMM and the host operating system 104 or the computer hardware 102 as appropriate.

Augmented Interrupt Controllers

Figure 4A:
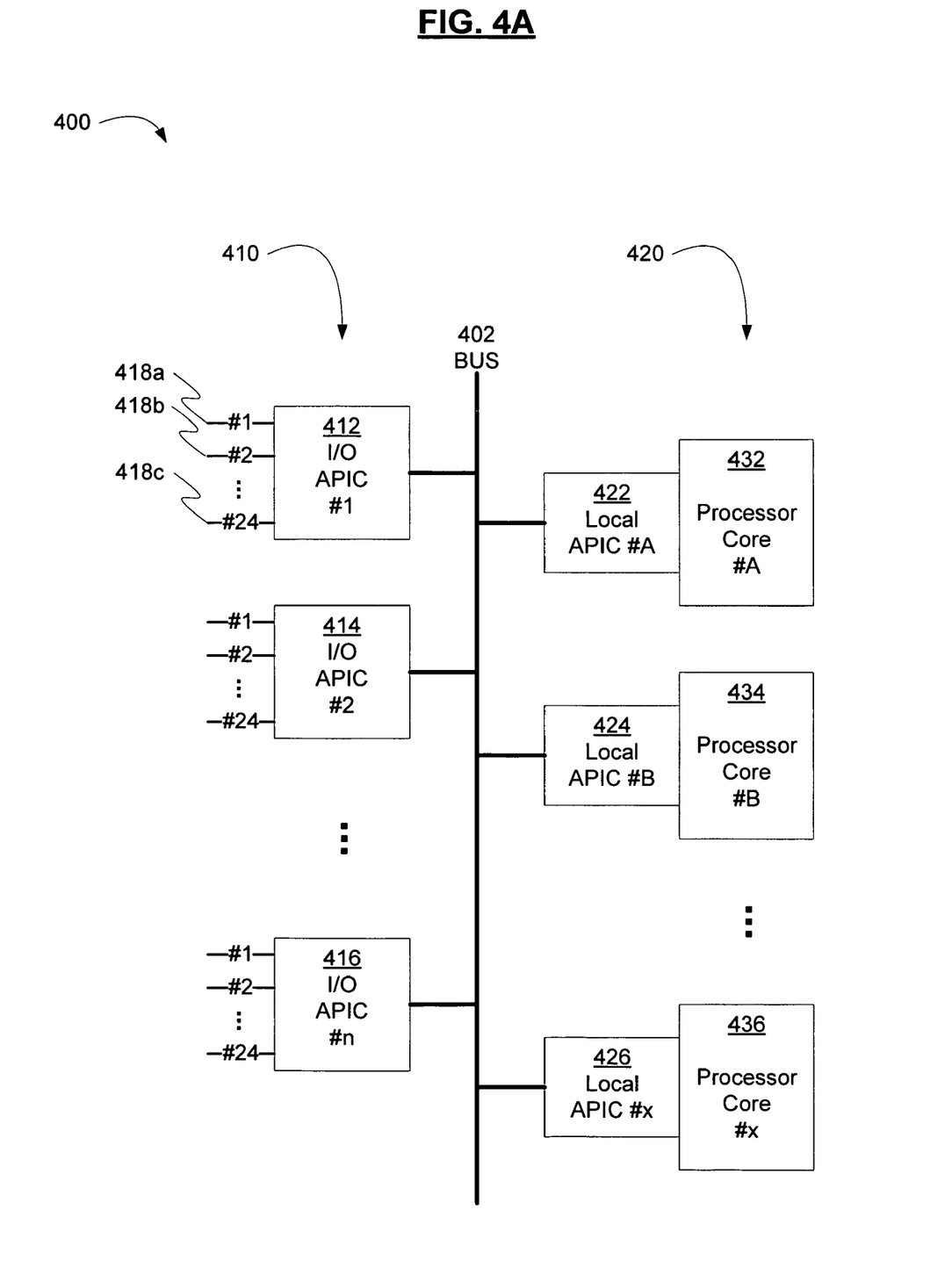
FIG. 4A is a block diagram illustrating a typical hardware interrupt controller (also known as an "advanced programmable interrupt controller" or "APIC")

FIG. 4A is a block diagram illustrating a typical hardware interrupt controller (also known as an "advanced programmable interrupt controller" or "APIC"). The APIC 400 comprises two groups of components interconnected by a bus 402: the I/O APICs 410 and the local APICs 420.

In this non-limiting example, and as shown for exemplary I/O APIC 412, each of the I/O APICs 412, 414, and 416 comprise twenty-four (24) input lines, e.g. 418a, 418b, and 418c, to handle up to twenty-four (24) unique device interrupts. Based on the specific device interrupt received (that is, depending on which of the input lines is activated), each I/O APIC uses a logical routing table (not shown) to forward, via the common bus 402, a specific interrupt to one of the local APICs 422, 424, or 426 corresponding to a specific processor core 432, 434, or 436 respectively (each processor having its own corresponding local APIC component).

Upon receipt of an interrupt from one of the I/O APICs 412, 414, or 416, each local APIC 422, 424, and 426—which in this non-limiting example can receive up to two-hundred-forty (240) unique interrupts-notifies its processor core 432, 434, or 436 respectively of the received interrupt. That processor core then stops what it is presently doing and immediately begin the laborious process of determining which device caused the interrupt and for what reason. After the processor core finally gathers this additional information pertaining to the interrupt, the processor core concludes the interrupt by notifying the local APIC to reprioritize other existing but not yet completed interrupt events based on the new information the processor core was able to ascertain regarding the source of and reason for the interrupt. The processor core then continues processing the next highest priority interrupt (which may have been the same interrupt event it had started working on prior to handling this latest interrupt, or it may be this newest interrupt, depending on their relative priorities).

Although each local APIC can be signaled for about two-hundred-forty (240) unique interrupt events, and each I/O APIC can generally be signaled for about twenty-four (24) unique intererrupt events, a typical PCI bus that is used to communicate between the I/O APICs and the local APICs is not sophisticated enough (e.g., it does not have enough unique signal lines) to differentiate between interrupt sources, etc. Consequently, the interrupt received by a local APIC for a specific processor core may correspond to more than one (and potentially several) possible interrupt events, and thus there is a need for the processor core to ascertain which device caused the interrupt (by polling its several devices corresponding to that interrupt) and ascertaining the cause of the interrupt (by collecting additional information from the interrupting device regarding the reason for the interrupt). In physical hardware this polling and info collection is very inefficient and resource intensive, and this inefficiency is several orders of magnitude greater in a virtual machine environment.

Figure 4B:
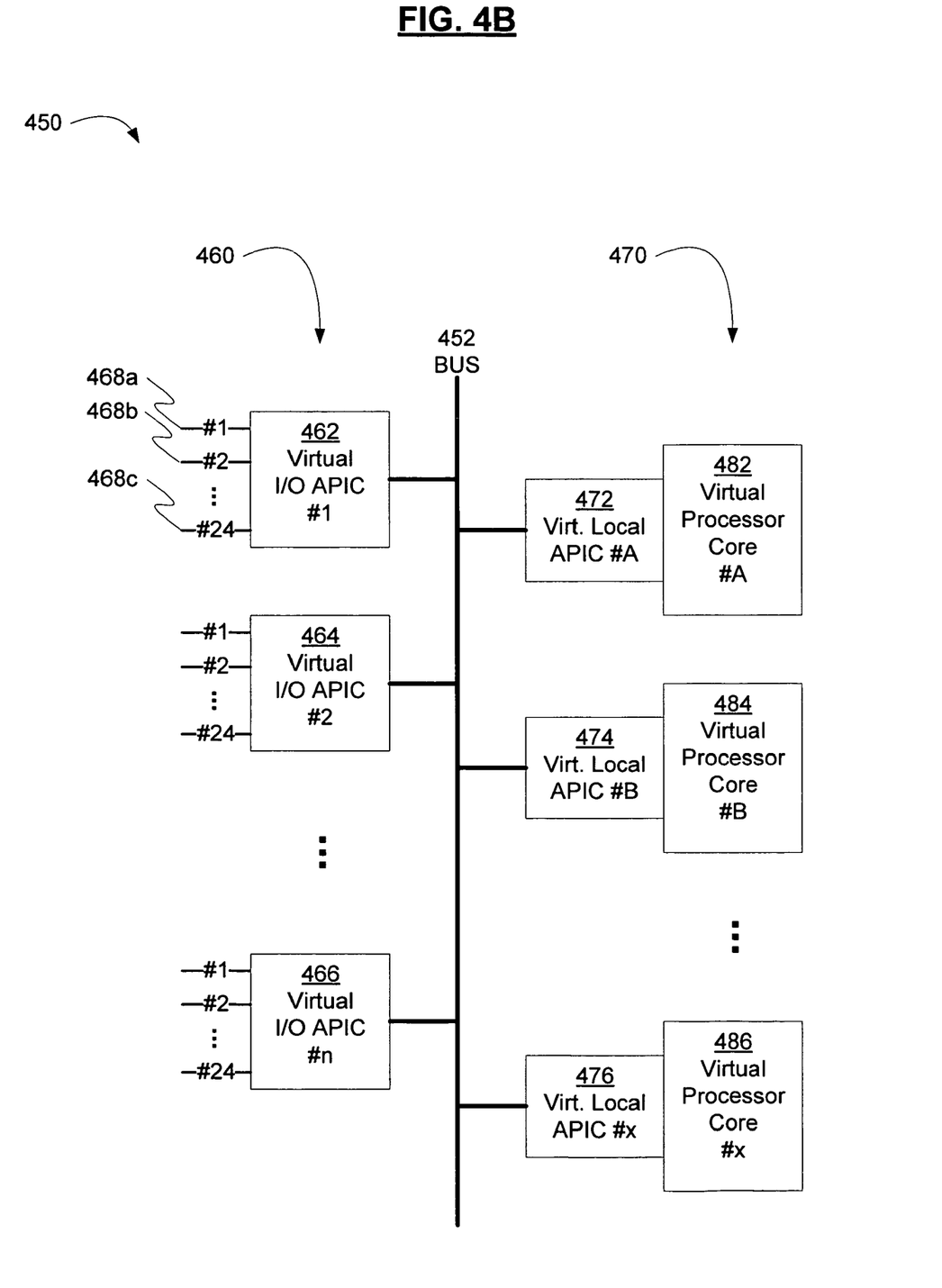
FIG. 4B is a block diagram illustrating a typical virtual interrupt controller, that is, a virtualized APIC in a virtual machine.

FIG. 4B is a block diagram illustrating a typical virtual interrupt controller, that is, a virtualized APIC in a virtual machine. The virtual APIC 450 logically comprises the same structural components (not shown) as a hardware APIC of FIG. 4A, except that the virtual APIC 450—as well known and readily understood by those of skill in the art of virtual machines exists as a software representation and, thus, requires substantially more instructions on the host hardware processor to perform interrupt operations, particular with regard to the interaction between the guest operating system, the hypervisor (or other virtualizer), and the physical hardware.

Figure 5A:
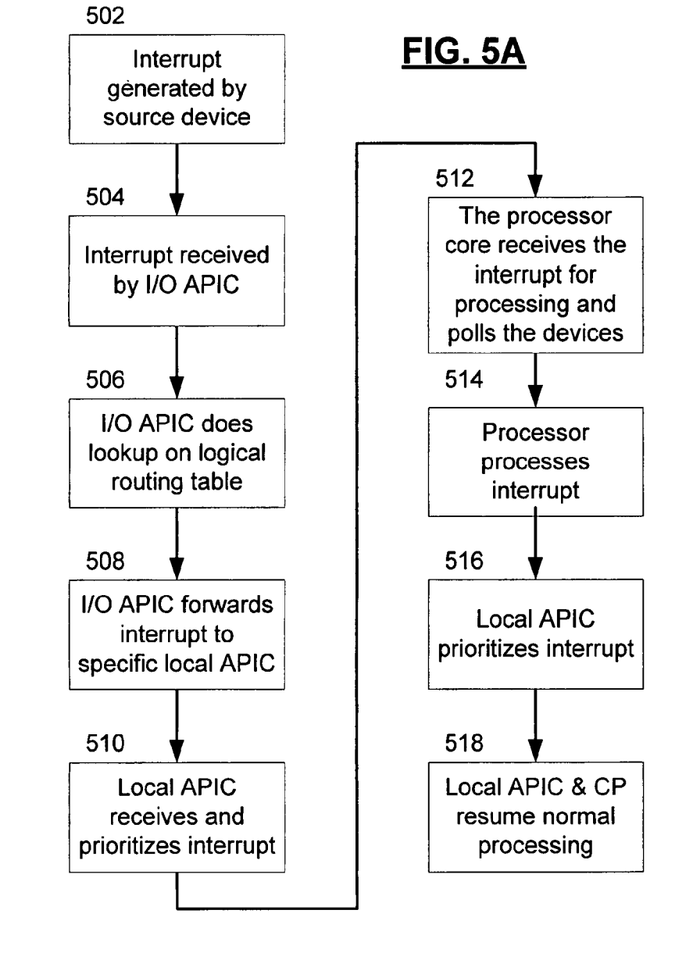
FIG. 5A illustrates a process flow diagram for a typical interrupt process flow.

FIG. 5A is a process flow diagram generally illustrating the typical interrupt process flow as already alluded to herein for FIG. 4A and which is similar for FIG. 4B (although the latter is more complex because of the additional interaction necessary between the virtual machine, the VMM, and the physical host hardware). In general, at step 502, an interrupt is generated by a source device and, at step 504, received by an I/O APIC connected to said devices via an interrupt input line. At step 506, the I/O APIC does a logical routing table lookup to ascertain which processor core and corresponding local APIC is designated to receive this specific interrupt and, based on this lookup at step 508, forwards the interrupt to the designated local APIC. At step 510 the specific local APIC receives and prioritizes the interrupt for further processing. At step 512, the processor core receives the interrupt for processing but, because it does not know the source of or reason for the interrupt, it must poll the various devices that could have caused the interrupt until the correct device is identified and the reason for the interrupt is ascertained. At step 514, and based on the source of the interrupt and the reason for the interrupt as determined at step 512 (together comprising the "interrupt information" or "i.i."), the processor then processes the interrupt and, when complete, receives the next highest priority interrupt the local APIC has to offer.

Although this approach is generally inefficient but has been marginally sufficient for physical hardware (interrupt controllers and core processors), these inefficiencies are magnified when virtualized in a virtual machine environment. However, unlike physical hardware which is difficult to modify, virtual hardware (i.e., the machine virtualized in a virtual machine environment) is relatively easy to modify and, as a result, numerous embodiments of the present invention herein are directed to simplifying interrupt processing via an augmented interrupt controller.

Figure 5B:
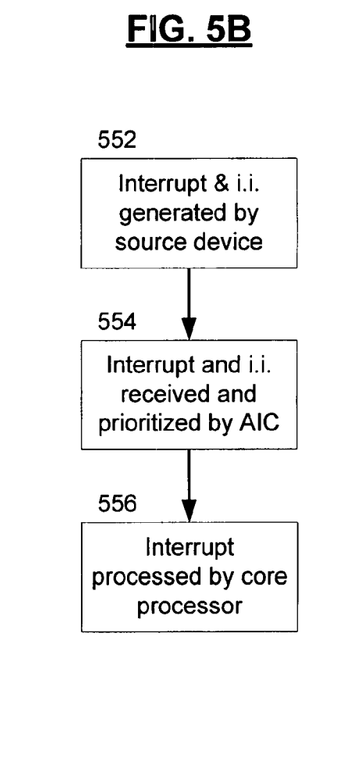
FIG. 5B illustrates a process flow diagram for an improved conceptual interrupt handling process using an augmented interrupt controller present in several embodiments of the present invention.

FIG. 5B is a process flow diagram illustrating the improved conceptual interrupt handling process using an augmented interrupt controller present in several embodiments of the present invention. In the figure at step 552, an interrupt generated by a source device (in this case, a virtual device that has been enhanced and thus comprises a "synthetic interrupt source" or "SIC") is accompanied by interrupt information comprising data as to the source of and reason for the interrupt (which, in the case of a virtual machine, may be automatically generated by enhancements made to the virtual devices being utilized). At step 554, this interrupt and accompanying interrupt information (which together comprise a "synthetic interrupt" or "SI") is received and prioritized by the augmented interrupt controller (AIC) and, at step 556, processed by the processor core without any need to poll the devices for further information.

It should be further noted that, for several such embodiments of the present invention, when a standard (non-SI) interrupt is received—such as from an actual physical hardware device—regular interrupt handling may proceed, although it is anticipated that even physical hardware devices may also be enhanced to provided SIs instead of standard interrupts.

Figure 6A:
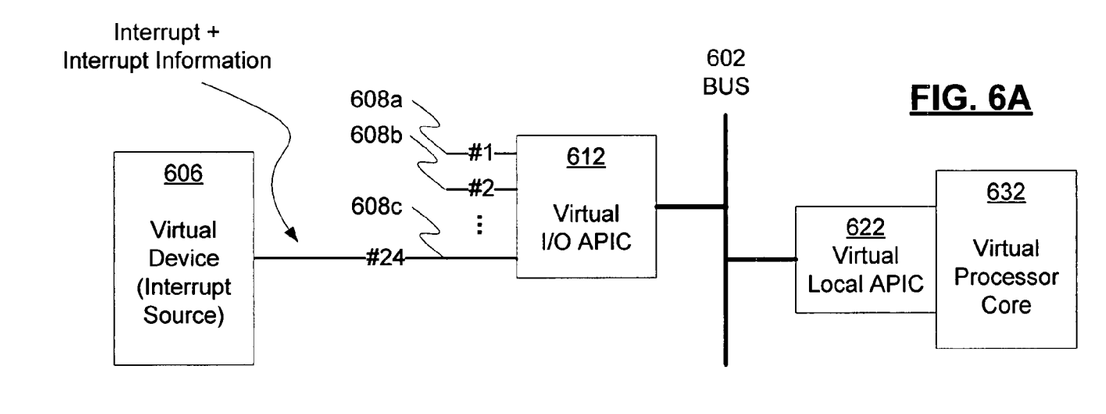
FIG. 6A is a block diagram illustrating augmented interrupt controllers for certain embodiments of the present invention where the interrupt controller interface is extended to accept and reliably deliver additional information associated with an incoming interrupt (e.g., a message signaled interrupt)
Figure 6B:
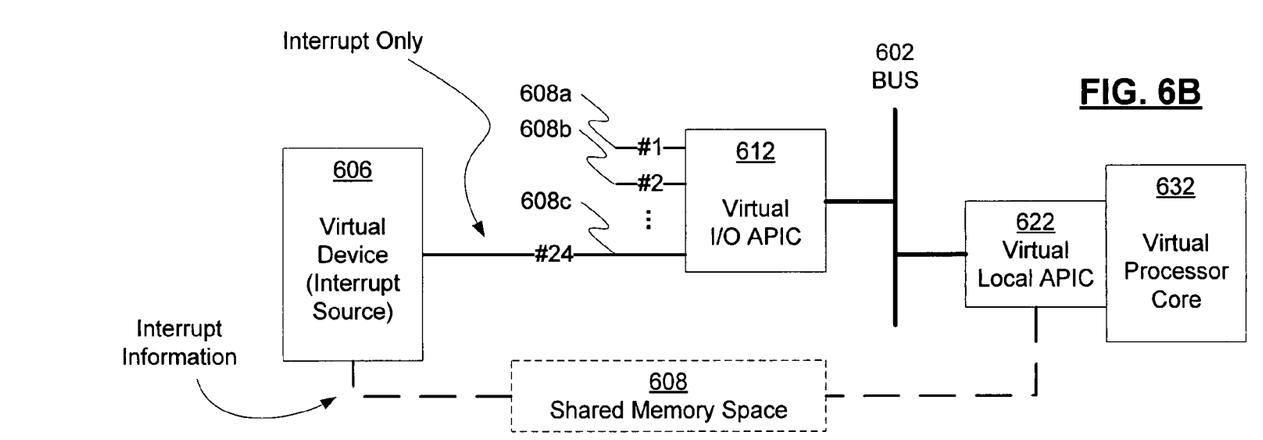
FIG. 6B is a block diagram illustrating augmented interrupt controllers for certain embodiments of the present invention where the interrupt controller interface is extended to accept and reliably deliver additional information associated with an incoming interrupt (where the additional information regarding the interrupt is placed by the source of the interrupt in a shared memory location).

FIGS. 6A and 6B are block diagrams illustrating augmented interrupt controllers for certain embodiments of the present invention where the interrupt controller interface in each is extended to accept and reliably deliver additional information associated with an incoming interrupt (that is, and SI). In FIG. 6A, the virtual I/O APIC 612 has been extended to accept additional information directly from the source of the interrupt 606 via, e.g., a message signaled interrupt. This additional information, together with the interrupt itself, comprise a synthetic interrupt (SI) that identifies the source of the interrupt and the reason for the interrupt. This additional information, along with the interrupt, are passed from the I/O APIC 612 via the bus 602 to the appropriate local APIC 622 which, in turn, provides this information directly to its core processor 632. For certain alternative embodiments, the local APIC may also be enhanced to receive the additional information and prioritize the interrupt based on that additional information as well as the interrupt priority it receives.

In FIG. 6B, interrupts are received by the I/O APIC 612 and passed to a local APIC 622 and, in turn, passed to the processor core 632, but additional information regarding the interrupt is placed by the source of the interrupt 606 in a shared memory location 608 which is automatically accessed by the core processor 632 in lieu of polling devices to ascertain the source and reason for the interrupt as this additional information in the shared memory location identifies the source of the interrupt and the reason for the interrupt. For certain alternative embodiments, the local APIC may also be enhanced to access the additional information in the shared memory location and prioritize the interrupt based on that additional information and the interrupt priority it receives.

Additional Enhancements for Augmented Interrupt Controllers

In addition to the foregoing, since in a hypervisor system some interrupts may be sent by software, it is important for the recipient of an interrupt (that is, the core processor) to have a reliable way to discover the source of that interrupt in order to be sure that it was not spoofed by other, malicious software. Similarly, a partition may need to know that some information associated with that interrupt has been delivered intact. This can be accomplished by defining a memory-mapped extension to the interrupt controller, with a specified structure that is populated as part of the delivery of an interrupt to the processor core. Some fields in this structure will contain parameters provided by the sender, particularly a "reason code" giving more detail about the event being signaled. Other fields, particularly a "sending partition identifier" field, will be provided by the interrupt controller. Since this structure is accessible only by the recipient and the interrupt controller, the recipient can rely on the authenticity of the interrupt parameters. Since this structure is populated as part of delivering an interrupt, the retrieval of this additional information is also much more efficient than the traditional model of searching for and querying the sender. These structures are associated with conventional interrupt vectors, so that interrupt prioritization and delivery can fit in with and continue to take advantage of current mechanisms.

For certain embodiments, the system may contain additional virtualization hardware that allows devices to be assigned to specific partitions. In this case, interrupts and associated parameters sent by such devices can be protected in the same way as software-initiated interrupts.

Moreover, since typical interrupt controllers already have a facility for sending inter-processor interrupts, it may be advantageous for when this facility is accessed from within a partition in a virtual machine environment to provide the same service for sending interrupts to virtual processors within that partition. While a separate facility is needed for sending interrupts to other partitions, or for sending interrupts with parameters within the sending partition, this separate facility could be a family of command registers similar to a conventional controller or it could be a functional interface, though regardless of how the interrupt is sent the mechanism to receive the interrupt would remain the same.

In addition, when many similar interrupt events are needed such as readable/writable signaling for higher layer communications protocols an alternative arrangement might be provided where the interrupts continue to indicate a boolean condition with no further information. However, while conventional interrupts serve this basic function, conventional interrupt vectors are a relatively scarce resource, and thus these embodiments may use additional space in the interrupt controller to hold a relatively large bitmap of flags behind a single conventional interrupt vector, in effect multiplying the size of the interrupt request table by some operating system specified factor. This bitmap multiplication can happen either above or below the level of granularity that affects dispatch priority and is fairly easy to do in a virtual machine context given that the necessary virtual registers, which would be difficult to replicate in hardware, are quite easy to virtualize in software. For example, in a conventional APIC, while the top four bits of an interrupt vector indicate its priority and the bottom four are used to distinguish between different signals of the same priority, the bitmap extension described here could expand the latter group from 16 possible values to, say, 4096 distinct or more. Like the interrupts with parameters described above, these interrupts could be sent either by an extended family of command registers or by a functional interface. For some embodiments, a single conventional interrupt vector could be configured arbitrarily to handle either kind of interrupt or both.

Similarly, other embodiments of the present invention could also be used for building higher-level communications protocols for use between two partitions. While various methods have been devised for packaging messages for transport over a byte-stream-oriented transport and other similar mechanisms, for sufficiently small messages the entire message body can be sent as parameters on an interrupt, effectively bundling the notification and the delivery of a message into one entity. This, in turn, allows the recipient to receive an entire message with no additional transitions from inside the partition to the virtualizer, since the entire body of the message will already be present in the partition's address space when the interrupt is received. When the data associated with a message is too large to fit entirely within the parameters facility, a higher-level marshaling layer must move the information in a less efficient way, but most messages will fit within the space allowed for interrupt parameters, and can therefore be handled much more efficiently. For certain embodiments, the size of the parameter regions could be configured at compile time or at run time to create the optimal balance for a particular load. This concept could be implemented as an optimal asynchronous communication protocol between partitions, each sending interrupts to another. The protocols could include (a) simple standalone message delivery protocols, with or without response messages associated with initiated messages; (b) conventional RPC protocols, which expose synchronous and/or asynchronous functional interfaces to callers, using interrupts to marshal the action and data across the partition boundary; and/or (c) peer-to-peer arrangements with an arbitrary numbers of participants, each freely sending interrupts to each other.

Cross-partition synchronization would be another application for various embodiments of the present invention. While operating systems generally provide synchronization primitives that finction by sharing data structures with their scheduler, there is typically no sharing of such structures between partitions and another mechanism is required. In this regard, a class of synchronization objects within a partition can be built such that objects in multiple partitions could reflect a single logical state. Such a mechanism would enable intra- and inter-partition synchronization to work through the same interfaces.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application, which may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A method of augmented interrupt control in a computer system having a virtual machine with a virtual device that is a source of a synthetic interrupt, said method comprising:
    generating, at said virtual device, a synthetic interrupt comprising both an interrupt signal and corresponding interrupt information, wherein said corresponding interrupt information at least includes a reason for said interrupt signal, and wherein said synthetic interrupt is to be received by an I/O virtual interrupt controller;
    receiving and routing said synthetic interrupt using said I/O virtual interrupt controller to a corresponding virtual interrupt controller that is local to a virtual processor;
    determining a source of the synthetic interrupt based on the corresponding interrupt information;
    determining a priority, by the virtual interrupt controller that is local to the virtual processor, said synthetic interrupt based at least in part on the determined source, wherein said local virtual interrupt controller prioritizes said interrupt signal of the synthetic interrupt according to said interrupt information; and
    sending, in accordance with the priority, said interrupt signal to said virtual processor.

2. The method of claim 1 wherein said interrupt information further comprises an identification of the virtual device as the interrupt source.

3. The method of claim 2 wherein determining the priority includes said local virtual interrupt controller using said interrupt information to determine the priority of the interrupt signal for processing without polling any devices to identify the source of the interrupt signal.

4. The method of claim 3 wherein the local virtual interrupt controller includes a virtual local APIC (advanced programmable interrupt controller), further wherein the virtual local APIC is configured to determine the priority of the interrupt signal without involvement of a corresponding virtual processor core.

5. The method of claim 3, further comprising:
    sending said interrupt information from the virtual device to the virtual interrupt controller via a shared memory.

6. A computer-readable storage medium comprising:
    instructions for instantiating a virtual machine with an interrupt source comprising a virtual device, the virtual machine further comprising a plurality of virtual I/O interrupt controllers, a plurality of virtual local advanced programmable interrupt controllers (APICs), and virtual processors corresponding to the virtual local APICs;
    instructions for generating and sending, from the virtual device, both an interrupt signal and interrupt information corresponding to the interrupt signal, to one of the virtual I/O interrupt controllers, wherein the interrupt information is used by the virtual I/O interrupt controller to determine which virtual local APIC to send the interrupt signal to; and
    wherein said interrupt information at least includes a reason for said interrupt signal.

7. The computer-readable storage medium of claim 6 further comprising instruction whereby said interrupt information further comprises an identification of the interrupt source.

8. The computer-readable storage medium of claim 7 further comprising instructions for said determined virtual local APIC to use said interrupt information to, prioritize the interrupt signal for processing.

9. The computer-readable storage medium of claim 8 further comprising instruction whereby said interrupt signal is prioritized by the determined virtual local APIC without involvement of a corresponding virtual processor core.

10. The computer-readable storage medium of claim 8 further comprising instructions for said interrupt information to be communicated from the virtual device interrupt source to the virtual interrupt controller or a corresponding virtual processor core via a shared memory.

11. A device for implementing a virtualized interrupt control in a computer system, said device comprising:
   a processor coupled to a computer readable storage medium, the computer readable storage medium including:
   instructions for generating and sending both an interrupt signal and interrupt information to a virtual interrupt controller, wherein said interrupt information at least includes identification information and includes a reason for said interrupt signal; and
   instructions for using, by said virtual interrupt controller, said interrupt information to prioritize the interrupt signal for processing by a virtual processor.

12. The device of claim 11 further comprising:
   instructions for sending the interrupt signal from the virtual device to the interrupt controller via a shared memory location.

13. A method of providing extended interrupt information to a virtual processor and a virtual interrupt controller, the method comprising:
   generating an interrupt at a virtual device, the virtual device comprising a virtualized software analogue of a peripheral hardware device of a type that generates interrupts;
   storing along with said interrupt, by the virtual device, extended interrupt information that provides information about the interrupt generated by the virtual device, including at least a reason for said interrupt;
   issuing the generated interrupt by the virtual device; and
   receiving the interrupt at a virtual interrupt controller, and in response using, by the virtual interrupt controller, the stored extended interrupt information to determine the reason for the interrupt.

14. A method according to claim 13, wherein the using the extended interrupt information comprises prioritizing the interrupt.

15. A method according to claim 14, further comprising communicating the interrupt from the virtual interrupt controller to a virtual processor in accordance with the prioritization of the interrupt.

16. A method according to claim 13, wherein storing comprises storing the extended interrupt information to a shared memory where it is accessed by the virtual interrupt controller.

17. A method according to claim 16, further comprising accessing, by a virtual processor, the extended interrupt information in the shared memory.

18. A method according to claim 13, wherein storing comprises sending the extended interrupt information to the virtual interrupt controller.

19. A method according to claim 18, further comprising:
   sending the extended interrupt information from the virtual interrupt controller to a virtual processor.

20. A method according to claim 13, further comprising:
   delivering the interrupt from the virtual controller to a virtual processor, where a virtual machine partition identifier is also sent from the virtual controller to the virtual processor.

21. A system for an augmented interrupt controller and synthetic interrupts, said system comprising:
   a processor coupled to a computer readable storage medium, the computer readable storage medium including:
   instructions for a virtual device configured to generate and send a synthetic interrupt, said synthetic interrupt comprising an interrupt signal and associated interrupt signal information;
   instructions for a virtual input/output device interrupt controller configured to receive said synthetic interrupt and route said synthetic interrupt to a local virtual interrupt controller; and
   said local virtual interrupt controller configured to receive said synthetic interrupt from said virtual input/output device, and further configured to forward said synthetic interrupt to an associated virtual processor, wherein said virtual processor is configured to process said synthetic interrupt and determine that said virtual device caused said interrupt signal and further configured to determine a reason for said interrupt signal from the interrupt signal information.

22. The system according to claim 21, further comprising a shared memory space configured to store said associated interrupt signal information, wherein said shared memory space is accessible by both said virtual device and said local virtual interrupt controller.

23. The system according to claim 22, wherein said shared memory space has a specified structure configured to be populated as part of a delivery of said synthetic interrupt, wherein said structure comprises fields for parameters provided by a sender, including a reason code, and fields for an identifier field provided by an interrupt controller.

24. The system according to claim 21, wherein said virtual processor relies on said synthetic interrupt to prioritize said interrupt signal without further polling said virtual device.

* * * * *